United States Patent
Aaron et al.

(10) Patent No.: US 11,586,171 B2
(45) Date of Patent: Feb. 21, 2023

(54) AUTOMATIC CONTROL LOOP DECISION VARIATION

(71) Applicant: AT&T Intellectual Property I, L.P., Atlanta, GA (US)

(72) Inventors: Jeffrey Aaron, Atlanta, GA (US); James Fan, San Ramon, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 321 days.

(21) Appl. No.: 16/429,736

(22) Filed: Jun. 3, 2019

(65) Prior Publication Data

US 2020/0379434 A1 Dec. 3, 2020

(51) Int. Cl.
*G05B 19/408* (2006.01)
*G06F 11/34* (2006.01)

(52) U.S. Cl.
CPC ...... *G05B 19/4083* (2013.01); *G06F 11/3457* (2013.01); *G05B 2219/33125* (2013.01)

(58) Field of Classification Search
CPC .................. G05B 19/4083; G05B 2219/33125
See application file for complete search history.

(56) References Cited

U.S. PATENT DOCUMENTS

| | | | | |
|---|---|---|---|---|
| 2002/0186660 | A1* | 12/2002 | Bahadiroglu | H04L 69/163 370/468 |
| 2014/0281595 | A1* | 9/2014 | Baker | G06F 11/2273 713/300 |
| 2014/0336788 | A1* | 11/2014 | Paunonen | G05B 13/04 700/29 |
| 2016/0175962 | A1* | 6/2016 | Denis | B23K 9/095 219/137 R |
| 2020/0156254 | A1* | 5/2020 | Li | G06K 9/3241 |
| 2021/0141347 | A1* | 5/2021 | Vau | G05B 13/047 |

* cited by examiner

*Primary Examiner* — Nathan L Laughlin
(74) *Attorney, Agent, or Firm* — Gutin & Gust, PLC; Matthew Tropper

(57) ABSTRACT

A method includes defining a plurality of variables to modify in a control loop; collecting first data using a first variable of the plurality of variables while executing the control loop, generating a first result based on the collecting first data step, substituting a second variable of the plurality of variables for the first variable, collecting second data using the second variable while executing the control loop, generating a second result based on the collecting second data step, comparing the first result and the second result; and taking an action based on the comparing step.

20 Claims, 3 Drawing Sheets

AUTOMATIC CONTROL LOOP DECISION VARIATION

TECHNICAL FIELD

This disclosure relates generally to adaptation of automation schemes, and more particularly, to a system and method for implementing variations in a control loop to affect automation decisions.

BACKGROUND

Currently, automation is generally static and deterministic. In most cases, automation uses pre-defined actions based on a situation in which certain parameters are detected. These deterministic models may work for simple automations. However, these models provide no automatic way for the automation itself to discover whether variations in the control loop decisions would improve performance and which variations of decisions would be better under specific circumstances. Any changes to the automation must be manually set up, which is awkward, time consuming, and expensive. Repeated changes would also need to be manually updated in order to try different action variations, and considerable manual analysis would be needed to actually determine which variations worked better than the others. Also, setting up varying conditions would need to be manually done, which is complex, time consuming, and extremely expensive.

Accordingly, there is a need for a system and method for automatically varying an automation control loop decision system and method to conduct varying actions over time to test multiple situational responses to various conditions.

SUMMARY

The disclosure is directed to a method including defining a plurality of variables to modify in a control loop, collecting first data using a first variable of the plurality of variables while executing the control loop, generating a first result based on the collecting first data step, substituting a second variable of the plurality of variables for the first variable; collecting second data using the second variable while executing the control loop, generating a second result based on the collecting second data step, comparing the first result and the second result, and taking an action based on the comparing step. The taking step may include publishing the first result and the second result. In an aspect the plurality of variables may include: modifying the processing order of functions executed in the control loop; two or more threshold values and wherein the taking step comprises selecting one of the two or more threshold values to use when executing the control loop; variables used to scale an operation and wherein the taking step scales the application based on the comparing step; or variables that simulate failures and wherein the method further comprises analyzing the reconfigurability of a system based on the simulated failures. The method may further include repeating the substituting step, collecting step, generating step and comparing step for additional variables of the plurality of variables. The method may further include setting a threshold value and wherein the repeating step is halted based on calculations in the control loop exceeding the threshold value. In an aspect, the repeating step may be performed periodically or for a set period of time.

The disclosure is also directed to a method including configuring a decision recipe, executing the control loop using a first variable from the decision recipe, collecting data based on the executing step, analyzing the collected data to form a first result, determining whether there are additional variables available in the decision recipe, and if there are additional variables available, then substituting an additional variable for the first variable and repeating the executing, collecting and analyzing steps to form additional results. The method may further include grading the first result and the additional results wherein the grading is based on performance results or conformance to policies. The method may further include taking an action based on the first result and the additional results by comparing the first result and the additional results to determine an optimized variation and wherein the action includes using the optimized variation during operation of a platform The disclosure is also directed to a control loop for a platform including a decision recipe design module, a data collection module configured to collect data from operation of platform, an input-output interface, a processor coupled to the input-output interface wherein the processor is coupled to a memory, the memory having stored thereon executable instructions that when executed by the processor cause the processor to effectuate operations including executing the control loop using a first variable retrieved from the decision recipe design module, analyzing the collected data to form a first result, determining whether there are additional variables available from the decision recipe design module, and if there are additional variables available, then substituting an additional variable for the first variable and repeating the executing, collecting and analyzing steps to form additional results. The operations may further include comparing the first result and the additional results to determine an optimized variation and wherein the action includes using the optimized variation during operation of the platform. In an aspect, the decision recipe may include a set of variables based on policies or a set of thresholds and the operations further comprise determine an optimum threshold from the set of thresholds for operation of the platform.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
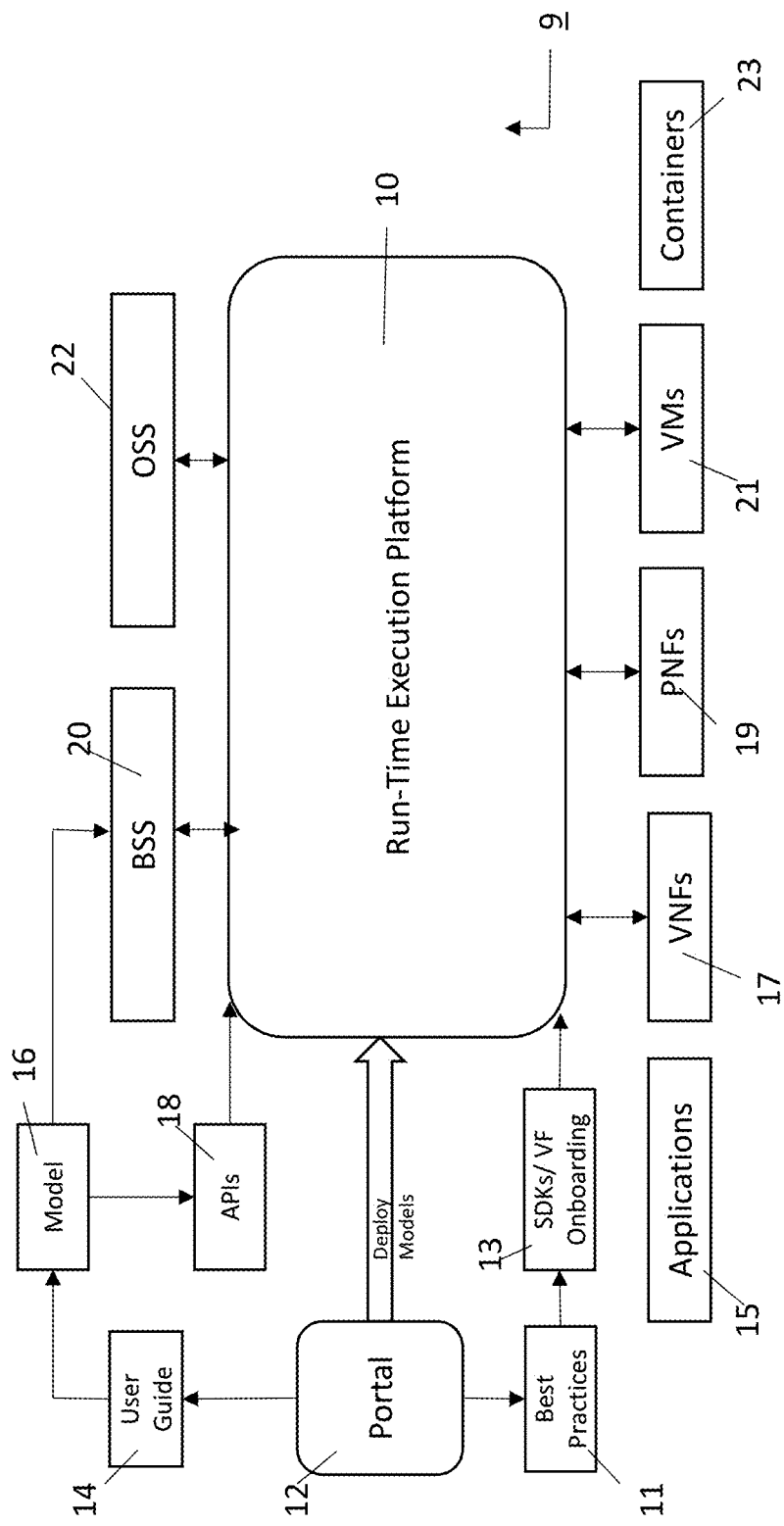
FIG. 1 is a representation of a platform configuration on which the systems and methods of the present disclosure may be implemented.

Overview. As detailed herein, the present disclosure is directed to a system and method to set up individual variations or variation recipes to control automation variation schemes, set operational value ranges and/or policies, and activate automation instances such as, for example, control loops, to have the automation system operate with such variations over time. The automated system may operate in various schemes which may, for example, be based on policies, process flows, and the like. The automated system may then record the results of each variation used and summarize the performance of the automation system under such variations. A particular automation run may last several days or several months with the variations being inserted over time to evaluate the effectiveness of the automation system in response to a broad set of situations. There may be pre-defined variations of an action to perform, which may, for example, be five (5) variations or more, perform a set of variations pre-programmed explicitly in advance or via a variation recipe that enables the control loop to construct variations based on conditions at the time an action is needed or taken. This may then enable a control loop to operate over time in a somewhat non-deterministic manner, and gradually determine which variation(s) works best under what specific circumstances.

The disclosure provides a unique and innovative system and method for automation by developing policies, rules or any other methods to make similar decision/outcomes/actions based on a set of inputs. Variation of the automated control loop may be configured by designing variation recipes. The automated control loop may then be configured by setting the variation, performance, labeling, publishing and notification polices. The basic automated control loop operates by a series of steps including collecting data, analyzing that data, making decisions based on that analysis, adjusting decisions based on the variations set forth in the variation recipe, and taking a variation of the base action determined by the basic automated control loop policy. The variation recipe may contain variations to portions of the automated control loop or the entire automated control loop and such variations may vary over time.

The automated control loop results are analyzed, which analysis may, for example, be based on performance-analysis policies. The automated control loop results are graded which may, for example, be based on using performance-results policies acting on the analysis results. Variation instance data are collected for the current run of the automated control loop, which may, for example, be based on labeling-collection policies. Data may then be aggregated and formatted, which may, for example, be based on labeling-assembly policies. Data may be labeled based on labeling policies. Publishing and/or notifications may be generated based on publishing or notification policies which publishing or notifications which may be a function of certain thresholds). The automated control loop may then cycle back to the start of the basic automated control loop using either the basic loop parameters or another variation of the automation control loop parameters. The automated control loop may be activated or deactivated on command or the variation recipe may have an operational duration set. These and other features are set forth in more detail below.

System Architecture. The present disclosure is applicable across multiple industries and with various configurations. For the purposes of this disclosure, an exemplary but non-limiting software defined network telecommunications system utilizing virtual network functions will be used.

Generally, a run-time execution platform 10 shown in FIG. 1, which may, for example, be configured as an ECOMP/ONAP platform and which may be considered the intelligence in a software defined network (SDN) that provides lifecycle management and control of software-centric network resources, infrastructure and services. It will be understood that ECOMP/ONAP is but one example of a run-time execution platform 10 which may serve as the operating environment for the present disclosure and that ECOMP is an execution platform owned by an affiliate of the assignee of the present disclosure. The run time execution platform 10 may be a reusable platform of software assets comprising the following functionality:

Service Design and Creation (SDC)—Provides a well-structured organization of visual design & simulation tools, templates and catalogs to model and create resources, services and products;

Service Orchestration (SO)—Arranges, sequences and implements tasks based on policies and rules/recipes to coordinate the creation, modification or removal of logical and physical resources in the managed environment;

Data Collection, Analytics and Events (DCAE)—Provides real-time fault, performance, event and other data collection, correlation & analysis to manage service, network and infrastructure health and support closed loop automation;

Policy—Modifiable rules, assertions and/or conditions to enable real-time decision making on corrective actions and configuration changes in the software-centric network ecosystem;

Active and Available inventory (A&AI)—tracks the dynamic relationships of virtualized networks, services & resources, their relationships and status to maintain ECOMP/ONAP platform integrity and the global inventory it manages;

DN & Application Controller—SDN Controllers configure, monitor and maintain the health of network services and elements throughout their lifecycle. Application controllers configure, monitor and maintains the health of an applications throughout their lifecycle; and Portal—Provides a common portal framework and UI architecture for creating and operating virtual infrastructure and services. Examples of capabilities include common look and feel, role administration, access control, SDK with plug-ins and web components.

While the present disclosure describes the automatic variable automation of control loops in the in the context of run time execution platform policies, the system and method described herein, and the claims appended hereto apply to the variation of automated control loops generally.

With reference to FIG. 1, there is shown a system 9 in which the present disclosure may operate. The system 9 may be configured to support the provision, operation and maintenance of a wireless communication network which may, for example, be 3G, 4G/LTE, 5G, or any other wireless communication system now known or to be developed. The wireless communication network may be configured in part or in whole using software defined network components. The system 9 may include a run-time execution platform 10 which may, for example, be an ECOMP/ONAP platform. The run-time execution platform 10 may also be referred to simply as platform 10 herein. The platform 10 may be a single entity that provides management functions in a uniform manner to onboard, deliver and manage the lifecycle of SDN resources and services. The applications that use the platform 10 may interact with it via application program interfaces (APIs) 18 so applications need not have to know all of the inner components that comprise platform 10 and system 9.

The platform 10 may be accessible by a portal 12 which may, for example, be a server or other device that is operable to access and control the platform 10 and through which user or service provider generated models may be deployed on platform 10. A user guide 14 may assist a user in creating models 16 for an application. The models 16, together with APIs 18, may then determine the resources desired for the business support systems (BSS) 2 which in turn, may access the platform 10 for placing orders, monitor usage and perform other accounting functions. The models 16 and APIs 18 may also be used to determine and request features, functionality and capacity of the operational support systems (OSS) 22, which may, for example, include capacity, fallout, and key performance indicators (KPIs) and the like.

The portal 12 may also provide access to best practices 11 for SDN networks with respect to on-boarding and configuring new applications 15. Through the portal 12, users may access software development kits (SDKs) and virtual function on-boarding functions 13 to support models 16. From there, the platform 10 may control the instantiation of virtual network functions (VNFs) 17, physical network functions (PNFs) 18 and virtual machines (VMs) 21.

Figure 2:
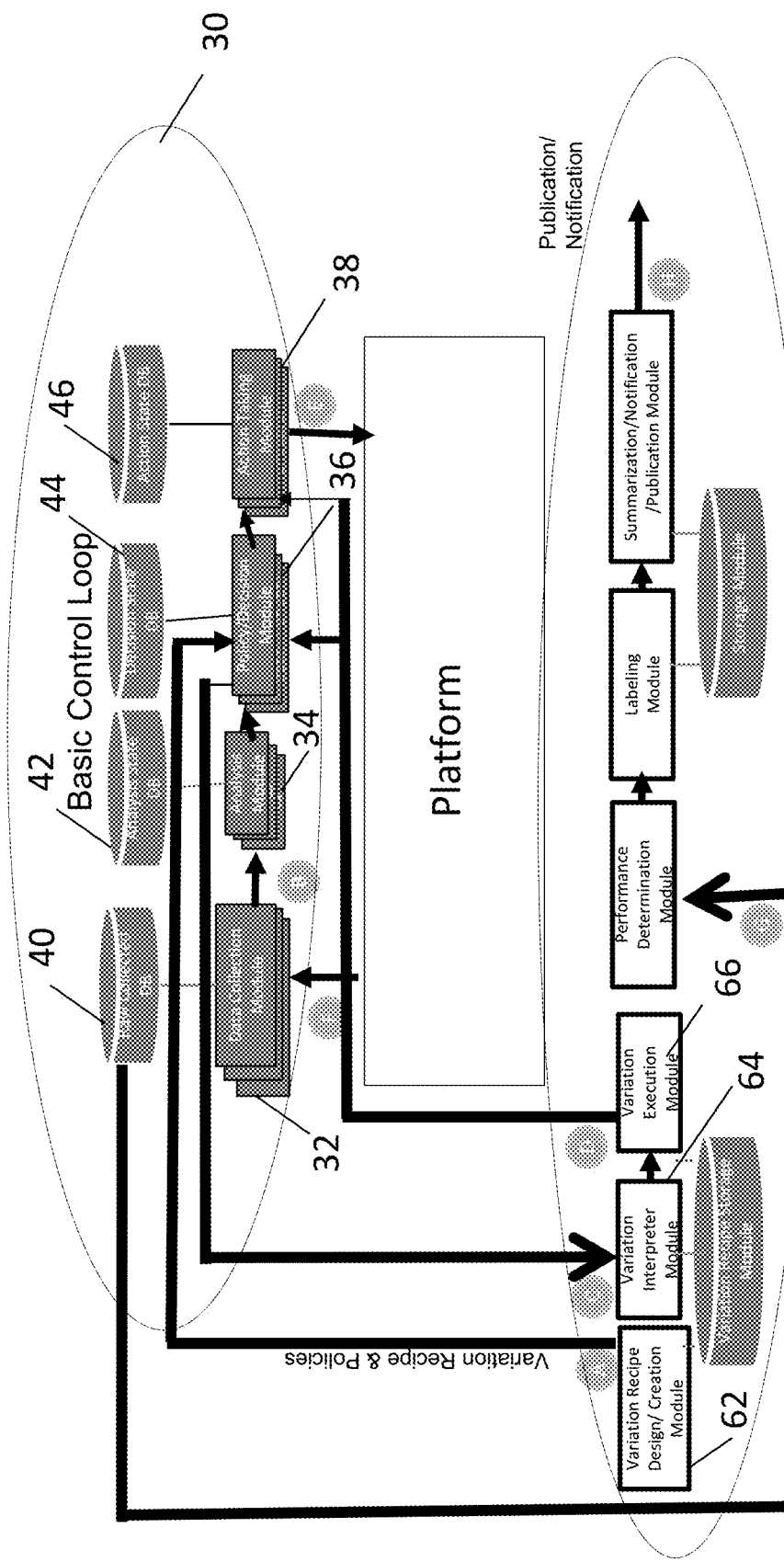
FIG. 2 is a representation of an architecture in which variation recipes may be developed and applied to automated control loop variables in accordance with the present disclosure.

With reference to FIG. 2, there is shown platform 110 which may, for example, be similar to platform 10 described above. In an aspect, platform 110 may be controlled and/or accessed by an automatic control loop 30. The basic automatic decision control loop 30 may include a data collection module 32 which collects raw data and stores such raw data in raw data storage database 40. The data collection module 32 may also pass the raw data collected to the analysis module 34 which analyzes the raw data to generate an analysis state. The analysis state data may then be stored in analysis state database 42 and passed to the policy/decision module 36. The policy/decision module 36 will act on the analysis state data by applying policies, rules, thresholds or other parameters to such data and make decisions based on the application of such policies. The output of the policy/decision module 36 may be stored in a decision state database 46 and passed to the action taking module 38 which will take certain action based on the processed data collected from the platform 110.

The basic decision control loop flow may then, for example, be characterized as data being generated by the platform 110, collecting of that data by data collection module 32, analyzing the collected data by analysis module 34, making decisions based on policy considerations by the policy/decision module 36, generating actions by the action taking module 38, and feeding those actions back into the platform 110. As such, the automated control loop may automatically monitor and maintain the operation of platform 110.

Continuing with the description of FIG. 2, there is shown additional automatic control loop decision variation modules and associated databases, collectively the automatic control loop decision variation modules 60 configured in accordance with the present disclosure. There is a variation recipe design and creation module 62 which may, for example, be used by an operator or programmer to develop one or more variations to feed into the basic control loop 30 decisions. Such variations, for example, may include but are not limited to, modifying the order that the steps of the basic control loop 30 is processing, changing the set of steps or the number of steps that the basic control loop 30 is processing and providing different variations of an "If, While, Then" rule structure and content. Other exemplary variations may also include, but are not limited to, setting different thresholds for certain events and taking actions based on the data compared to those thresholds, setting a different number of re-tries before doing something else, which may, for example increase the number of re-tries from 3 to 5 before generating a trouble ticket, creating a different scope of action based on the detection of an event which may, for example, be limited to one element or limited to a subset of components of that element, broadened to a group of elements or an overall system or service. Different trigger conditions or the scope of those trigger conditions may be modified. It will be understood that the recipes of variations that may be programmed using the recipe design and creation module 62 is vast and may affect any aspect of the automatic basic control loop 30.

There may also be a variation interpreter module 64 which interprets the variation recipes that may be applied to the automated control loop 30 which may operate on the output data from the policy decision module 36 based on the particular conditions and variables being modified. The variation execution module 66 may then execute the variation determined by the variation interpreter module 64 and pass the output to the action taking module 38. In this manner, the variation(s) from the variation recipe may be applied on the processed data that has been first collected, then analyzed and having control decisions made based on policies. The variation that has been executed is then then applied to the action taken module 38.

There is also shown a performance determination module 68 which may, for example, measures the performance of the automated control loop based on the variation recipes applied. The results may then be labeled by the labeling module 70, summarized in the summarization/notification/publication module 72, stored in the storage module 76, and published to an operator or notifying an operator of the results of the variations on the automated control loop 30.

Continuing with reference to FIG. 2, there is also shown a data flow applied to the architecture, the data flow identified by arrows A through H. The variation recipes and policies developed by the variation recipe design/creation module 62 are sent to the policy/decision module 36 of the basic automated control loop 30 as shown with arrow A. In parallel, data is collected from the platform 110 by data collection module 32. The data is analyzed and sent to the policy/decision module 36 which operates on the analyzed data using one or more variations contained in the variation recipe and sends the output to the variation interpreter module 64 through arrow C. The output of the variation interpreter module 64 is passed to the variation execution module for processing, the output of which is then sent to the action taking module 38 through arrow D.

After the action is taken with the varied automatic control loop decision variable at the action taking module 38, the output is fed back into platform 110. As such, the platform 110 does not necessarily know that the automatic control loop variables were changed for any particular control loop or control loop instance, but rather, the platform 110 sees data collected at arrow B and processing returned at arrow C as if there is simply the basic control loop 30 function being performed as before.

The process continues with the data collection module collecting the modified data set at arrow F, storing the modified data in the raw collected database 40, and then passing the modified data to the performance determination module 68 through arrow G. Once the performance of the variation is determined, labeled in the labeling module 70 and stored in the storage module 76, the performance is summarized and the results are either published or notifications at the summarization/notification/publication module 72 and sent through arrow H.

The automatic control loop variations may also include a "stop" function to prevent extreme degradation or unacceptable faults being introduced to the platform 110 or other applications. If certain thresholds are missed, then the "stop" function may be invoked in which case the variables in the automatic control loop 30 may be reset to default values or reset to the last known "safe" values.

Figure 3:
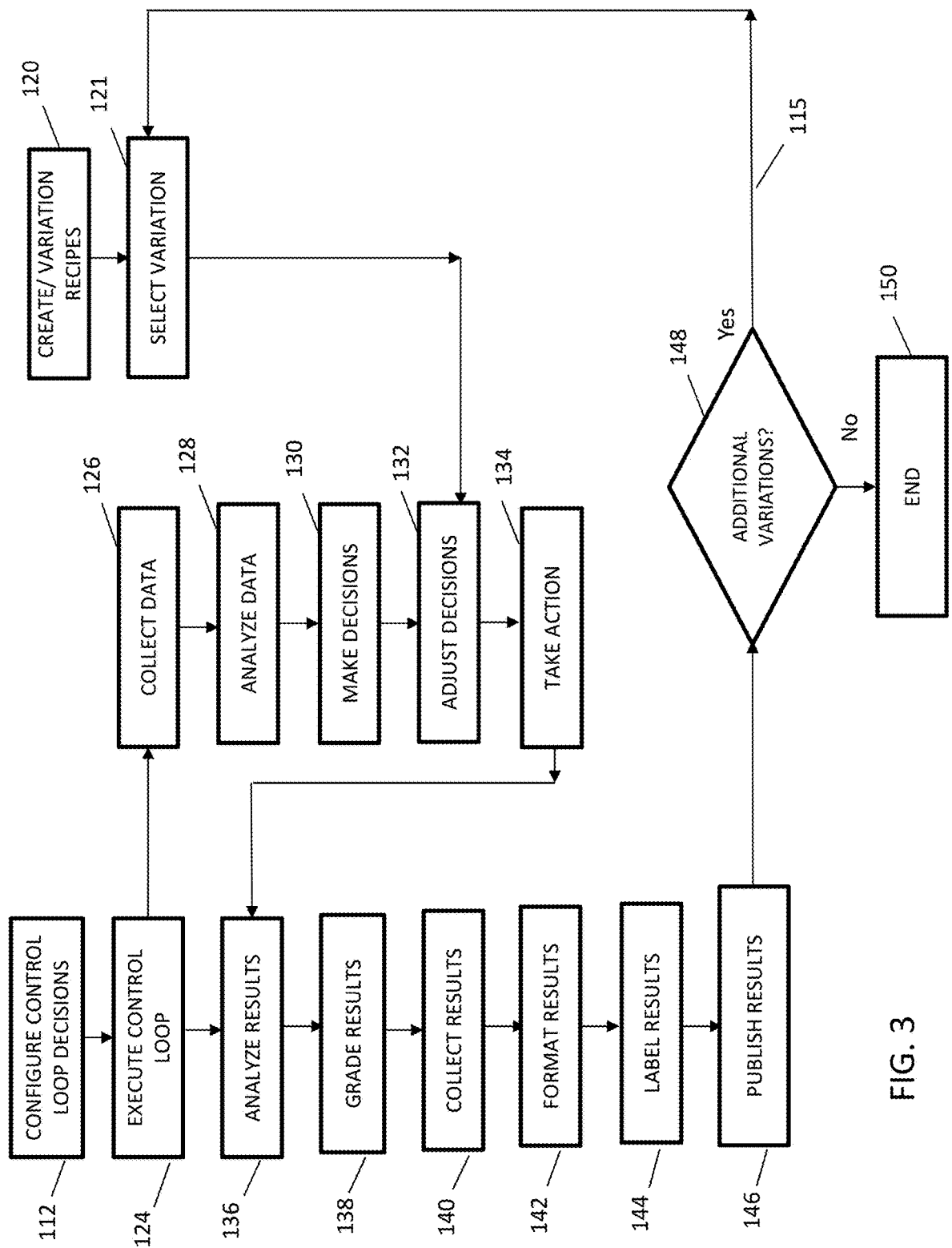
FIG. 3 is an exemplary flowchart of a method in accordance with the present disclosure.

Methods of Use. With reference to FIG. 3, there is shown a flow chart 115. At 120, variations of the automatic control loop are configured by designing variation recipes. At 122, the automatic control loop decisions are then configured, which may, for example, include setting one or more of the variation, performance, labeling, and publishing and/or notification policies. At 124, the basic control loop 30 operates which may, for example include the steps of collecting data 126, analyzing that data at 128, making decisions based on that analysis at 130, adjust decisions based on one or more variations included in the variation recipe at 132, and taking actions at 134 which may, for example, be a variation of the base action determined by basic control loop policy. The variations to be used at 132 may be selected at 121.

Continuing with the flow chart 115, the control loop results are analyzed at 136 which may, for example, include analysis based on performance-analysis policies. The control loop results are graded at 138 which grading may, for example, be done using performance-results policies acting on analysis results. At 140, variation instance data are collected which may, for example, include the results of the current run of the control loop, based on labeling-collection policies. The results data are then aggregated, organized and formatted as needed at 142 which may, for example, be based on labeling-assembly policies. Data are labeled at 144 based on labeling policies. At 146, publishing and/or notifications are generated based on publishing/notification policies and thresholds.

If there are more variations in the recipe or more time allotted to variations of the control loop at 148, the process then loops back to 121. For example, there may be multiple variations in the recipe or the variation recipe may have a run duration set for a particular time period, for example, 3 months. If there are no more variations in the recipe or no more time allotted, then the process is deactivated at 150. It will be understood that the process may be deactivated at any time upon command.

Use Cases. The following are exemplary use cases for the systems and methods of the present disclosure. It will be noted by those skilled in the art that these use cases are not intended to be exhaustive. Some categories of use cases include, but are not limited to:

Scaling, Load Balancing and Resilience. In a cloud-based application, being able to increase or decrease instantiations of virtual network functions to scale an application from a regional to a national level or to balance peak and off-peak loads is important. The system and methods of the disclosure may be used to analyze and recommend the selective scaling of an application, wherein one or more components of a virtual function or service may be scaled, rather than the entire application or set of components. The variation recipes may include alteration of certain variables to determine thresholds, loading, latency, potential failure points, or other variables to optimize the application. Moreover, the variation recipes may also include simulating failure of certain components to analyze the reconfigurability of an application or the recovery of an application from the failure. In an aspect, virtualized functions and services may be moved between clouds or be moved to different qualities of service within a particular cloud environment.

DDoS Mitigation. In an automated control loop, the system and methods disclosed herein may function to mitigate distributed denial of service conditions by using a variation recipe for testing for such conditions in the network over time and under various load conditions. Outputs may provide the ability to develop thresholds upon which to move virtual machines to another cloud or to block additional attacks on a particular server.

Security and Privacy. Variation of input conditions in an automated basic control loop may function to identify weaknesses in network security or to mitigate privacy concerns. Variety recipes may systematically check the vulnerability of an application, platform or network over time and under various conditions to identify weaknesses and suggest enhanced procedures or functionality to further secure an application, platform or network and to reduce privacy vulnerabilities.

Continuous Integration/Continuous Development. The system and methods of the present disclosure may also be used for continuous delivery, exploration, optimization, and development of applications or networks and for continuous integration/continuous development of such applications or networks. Selective positioning of functions or service.

Other Applications. The present disclosure has been described with respect to an automatic control loop decision variation applied to a platform 10. The systems and methods of the present invention may work for any automation to experiment with different decisions based on varying control variables. Other applications may include, but are not limited, to autonomous vehicles, transportation, factory management systems, home automations, virtual reality, augmented reality, and computer gaming, just to name a few.

The present disclosure provides a flexible ingestion of variations to be used as automatic control loop decision variables by generating explicit rules and/or polices in variation recipes. The recipes may be generated one-time and be allowed to run automatically over a specified period of time, which period of time may last several months, six months or longer. The recipes may be run periodically or upon command of a user. The reports and notifications that are output from the process may be used to tweak, refine, and further experiment for best results or to quickly try different strategies is resolving automatic control loop problems or inefficiencies. One or more variation recipe files may be employed and applied to automatic control loops. The process permits the easy modification of variables in automatic control loops which can be done as often as desired so that decision rules needing to be adjusted can be modified without impacting the rest of the solution. Moreover, selected tactics and strategies may be trialed before incorporation into an otherwise static and deterministic automated control decision loops.

As shown, the disclosure permits the use of variation recipes to enable key enhancements to automated control loop variables needed for optimization of processes. The systems and methods of the disclosure are directed to solving a practical problem by providing a real world and practical solution that removes or minimizes roadblocks likely to be encountered in otherwise deterministic solutions or otherwise would prove insurmountable in a pure machine learning or artificial intelligence applications of automated control loops. The system and methods help enable the ease-of-use in practice and can provide a comfort level of operator control for what would otherwise be an opaque black box that may help reduce uncertainty and add a measure of confidence to programmers, users and operators of automated control loops. The present disclosure allows explicit incorporation of changing business directives and preferences by automatically varying control loop variables and providing additional capabilities of monitoring and maintaining platforms 110 or other systems employing automatic control loops and associated algorithms.

The disclosure provides automation the capability to automatically vary its actions over time, such that the best action variations can be identified for every specific situation, even to a very precise degree, thus allowing optimization that would otherwise by impossible or extremely expensive to achieve The variation in taking different actions allows service providers to gain both expected and unexpected insights as compared to traditional firmly-deterministic action-taking control loops designed in advance via a priori requirements. Such requirements are generally either compromises, utilize considerable guesswork, and leave considerable room for improvement. The system and methods of the present disclosure permit a gradual expansion of knowledge that enable highly-optimized automation instances to be developed with minimal human effort, in a sense embodying a new type of machine learning where each and every control loop or automation instance employing the disclosure directly participates in key aspects of machine learning processes.

While examples of systems and methods for creating and applying variation recipes to automatic control loops have been described in connection with various computing devices/processors, the underlying concepts may be applied to any computing device, processor, or system capable of facilitating or hosting an automated control loop system, including cloud-based systems, proprietary systems or open source systems in which the framework of varying automatic control loop variable solutions may be implemented. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, Compact Disc-Read-Only Memory devices (CD-ROMs), Digital Versatile Discs, or, Digital Video Discs (DVDs), hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a system as described herein also may be practiced via communications embodied in the form of program code that is transmitted over some transmission medium, such as over electrical wiring or cabling, through fiber optics, or via any other form of transmission, over the air (OTA), or firmware over the air (FOTA), wherein, when the program code is received and loaded into and executed by a machine, such as an Erasable Programmable Read-Only Memory (EPROM), a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
defining a plurality of variables to modify in a control loop that is executed in a run-time execution platform in communication with a network;
collecting first performance data of the network by the control loop, the collecting of the first performance data using a first variable of the plurality of variables while executing the control loop, the first performance data characterizing a loading of the network;
generating a first result based on the collecting of the first performance data;
substituting a second variable of the plurality of variables for the first variable;
collecting second performance data of the network by the control loop, the collecting of the second performance data using the second variable while executing the control loop, the second performance data characterizing a latency of the network;
generating a second result based on the collecting of the second performance data;
comparing the first result and the second result; and
taking an action based on the comparing, the action comprising using an optimized variation during operation of the run-time execution platform, the action further comprising facilitating an increase or a decrease in an instantiation of virtual network functions.

2. The method of claim 1, wherein the taking the action further comprises publishing the first result and the second result.

3. The method of claim 1, wherein the plurality of variables comprises modifying a processing order of functions executed in the control loop.

4. The method of claim 1, wherein the plurality of variables comprises two or more threshold values and the taking the action comprises selecting one of the two or more threshold values to use when executing the control loop.

5. The method of claim 1, wherein the plurality of variables comprises variables that simulate failures and the method further comprises analyzing a reconfigurability of a system based on the failures that are simulated.

6. The method of claim 1, further comprising repeating the substituting the second variable, the collecting the second performance data, the generating the second result, and the comparing the first result and the second result for additional variables of the plurality of variables.

7. The method of claim 6, further comprising setting a threshold value and wherein the repeating is halted based on calculations in the control loop exceeding the threshold value.

8. The method of claim 6, wherein the repeating is performed periodically.

9. The method of claim 6, wherein the repeating is performed for a set period of time.

10. The method of claim 1, wherein the increase or the decrease in the instantiation of the virtual network functions scales a cloud-based application.

11. The method of claim 10, wherein the increase or the decrease in the instantiation of the virtual network functions scales the cloud-based application between a regional level and a national level.

12. A method comprising:
configuring a decision recipe;
executing a control loop that is associated with a run-time execution platform in communication with a network, the executing of the control loop using a first variable from the decision recipe;
collecting first performance data based on the executing of the control loop, the first performance data characterizing a loading of the network;
analyzing the first performance data to form a first result;
substituting an additional variable from the decision recipe for the first variable;
again executing the control loop, the again executing of the control loop using the additional variable from the decision recipe;
collecting second performance data based on the again executing of the control loop, the second performance data characterizing a latency of the network;
analyzing the second performance data to form a second result; and
facilitating a taking of an action based on the first result and the second result, the action comprising an increase or a decrease in an instantiation of virtual network functions.

13. The method of claim 12, further comprising grading the first result and the second result.

14. The method of claim 13, wherein the grading is based on performance results.

15. The method of claim 13, wherein the grading is based on conformance to policies.

16. The method of claim 12, further comprising comparing the first result and the second result to determine an optimized variation and wherein the action includes using the optimized variation during operation of the run-time execution platform.

17. A device comprising:
a decision recipe design module;
a data collection module configured to collect data from operation of a network;
an input-output interface; and
a processor coupled to the input-output interface, wherein the processor is coupled to a memory, the memory having stored thereon executable instructions that when executed by the processor cause the processor to effectuate operations comprising:
first executing of a control loop that is associated with a run-time execution platform, the first executing of the control loop using a first variable that is retrieved from the decision recipe design module, the first executing of the control loop collecting first performance data characterizing a loading of the network;
analyzing the first performance data to form a first result;
substituting a second variable from the decision recipe design module for the first variable;
second executing of the control loop, the second executing of the control loop using the second variable that is retrieved from the decision recipe design module;
collecting second performance data based on the second executing of the control loop, the second performance data characterizing a latency of the network;
analyzing the second performance data to form a second result; and
facilitating a taking of an action based on the second result, the action comprising an increase or a decrease in an instantiation of virtual network functions.

18. The device of claim 17, wherein the operations further comprise comparing the first result and the second result to determine an optimized variation and wherein the action that is taken is based on the first result and the second result and includes using the optimized variation during operation of the run-time execution platform.

19. The device of claim 17, wherein a decision recipe from the decision recipe design module comprises a set of variables based on policies.

20. The device of claim 17, wherein a decision recipe from the decision recipe design module comprises a set of thresholds and the operations further comprise determining a threshold from the set of thresholds for operation of the run-time execution platform.

* * * * *